(No Model.)
G. CAMPBELL.
HANGING BELLS.
No. 301,856. Patented July 15, 1884.
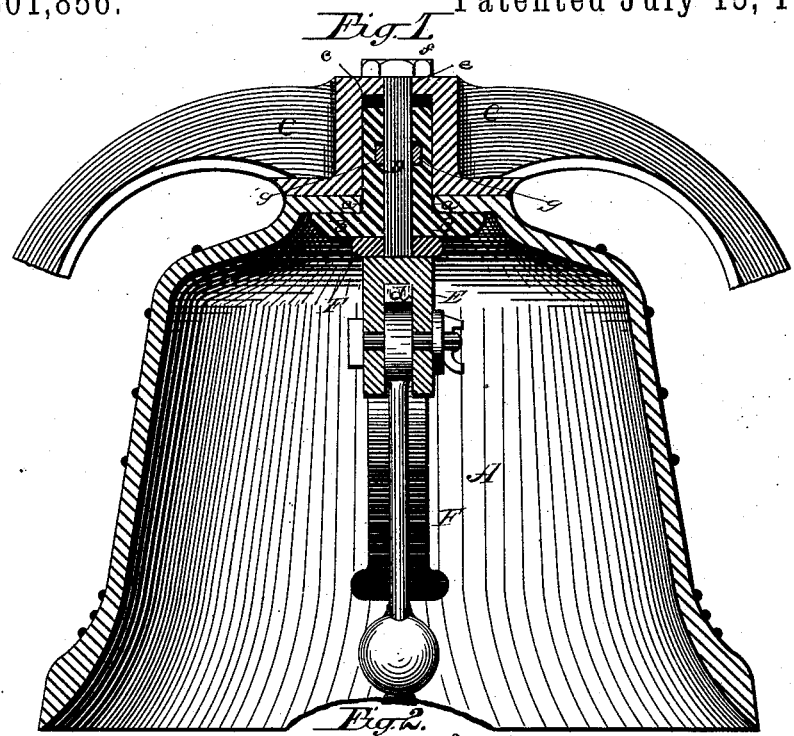
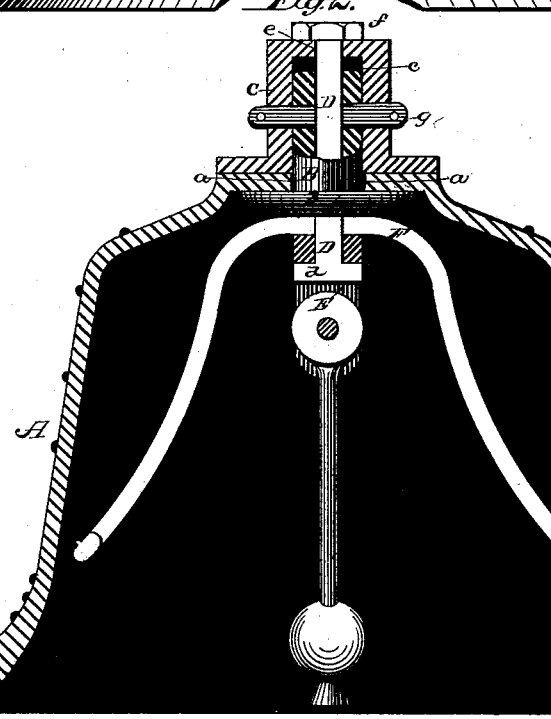
Attest:
C. B. Story.
Wm Sinnott.
Inventor:
Gardiner Campbell
By
Erwin & Benedict
Attorneys:

UNITED STATES PATENT OFFICE.

GARDINER CAMPBELL, OF MILWAUKEE, WISCONSIN.

HANGING BELLS.

SPECIFICATION forming part of Letters Patent No. 301,856, dated July 15, 1884.

Application filed February 12, 1884. (No model.)

*To all whom it may concern:*

Be it known that I, GARDINER CAMPBELL, a citizen of the United States, residing at Milwaukee, in the county of Milwaukee and State of Wisconsin, have invented certain new and useful Improvements in Bell-Hangings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in bell-hanging devices; and the objects of my invention are, first, to provide a strong and enduring hanging for heavy bells; second, to provide a duplicate support or safety device in the hanging apparatus of bells; third, to provide a simple but sufficient device whereby the turning or shifting of the bell is permitted and easily accomplished, and whereby the clapper and clapper-springs may be removed and replaced without removing the bell from its supporting-yoke. I attain these objects by the mechanism illustrated in the accompanying drawings, in which—

Figure 1 is a sectional view of a bell and yoke and my hanging apparatus in position. Fig. 2 is a sectional view of the same at right angles to Fig. 1.

Like letters refer to similar parts in both views.

The bell A is provided with an opening, $a$, in its crown, through which is upwardly inserted the sleeve B, said sleeve B being provided with the flange $b$, which flange is adapted to engage the under or inner side of the crown of the bell A, said sleeve B being also adapted to fit into the recess or socket $c$ in yoke C. The square supporting-bolt D, having cross-head $d$, is adapted to pass upwardly through the sleeve B, and through the opening $e$ in the yoke C, and, being provided at its upper end with a screw-thread, is adapted to be caught and held in position by the nut $f$. The clapper-block E is provided with an opening through its top sufficient only to admit therethrough the bolt D, and the springs F F, made of a single piece of metal, are provided with an opening at their top or middle, permitting the passage of the bolt D.

It is obvious that, the bolt D being passed upwardly through the openings in clapper-block E, the springs F F, the sleeve B, and the yoke C, (its cross-head $d$ engaging against the clapper-block E,) and being secured above said yoke by the nut $f$, will support and hold the clapper-block E, the springs F, sleeve B, and bell A firmly in position against the yoke C. The yoke C and the sleeve B are also provided with corresponding apertures through them, one on either side of the bolt D, through which apertures the keys $g$ are inserted. These apertures through the sleeve B are made slightly wider (vertically as the bell hangs) than the corresponding apertures through the yoke, so that when the bell is held in position rigidly against the yoke C by the bolt D the upper side of said apertures through the sleeve B will not engage upon said keys $g$; but should said nut $f$ be loosened or the bolt D give way said sleeve B and its supported bell would drop slightly and be caught and retained by said keys $g$, thereby, in case of the breaking or giving way of bolt D, preventing the bell from falling to the ground, and thereby, in case said nut F were purposely loosened, permitting it to be easily turned around upon and supported by the flange $b$ of sleeve B. This device also permits the removal of bolt D, clapper-block E, and springs F without taking the bell from the supporting-yoke C. The same result may also be attained by means of a set-screw or other equivalent device, instead of by these apertures and pins.

Heretofore bells have been hung as shown in Patents No. 30,338, issued to Meneely on October 9, 1860, and No. 92,470, issued July 13, 1869, to J. Register, and I make no claim to what is there shown.

Having thus described my invention, what I claim as new, and desire to secure by Letters Patent, is—

1. The bell A, having an opening through its crown, and sleeve B, having flange $b$ and apertures for the keys $g$, in combination with the yoke C and keys $g$, substantially as and for the purpose set forth.

2. In bell-hangings, the bell A, having an opening through its crown, the sleeve B, provided with flange b, and clapper-block E, having an aperture through its head for bolt D, in combination with yoke C, having recess c and aperture e, and bolt D, provided with head d and thread and nut f, substantially as and for the purpose set forth.

3. In bell-hangings, the bell A, having an opening through its crown, sleeve B, provided with flange b and aperture for key g, clapper-block E, and springs F, in combination with the yoke C, bolt D, and keys g, substantially as and for the purpose set forth.

In testimony whereof I affix my signature in presence of two witnesses.

GARDINER CAMPBELL.

Witnesses:
C. T. BENEDICT,
JAS. B. ERWIN.